United States Patent
Benedetto

(10) Patent No.: US 10,023,966 B2
(45) Date of Patent: Jul. 17, 2018

(54) ELECTROLYTIC CELL EQUIPPED WITH CONCENTRIC ELECTRODE PAIRS

(71) Applicant: Industrie De Nora S.P.A., Milan (IT)

(72) Inventor: Mariachiara Benedetto, Milan (IT)

(73) Assignee: INDUSTRIE DE NORA S.P.A., Milan (IL)

( * ) Notice: Subject to any disclaimer, the term of this patent is extended or adjusted under 35 U.S.C. 154(b) by 272 days.

(21) Appl. No.: 15/032,701

(22) PCT Filed: Dec. 3, 2014

(86) PCT No.: PCT/EP2014/076369
§ 371 (c)(1),
(2) Date: Apr. 28, 2016

(87) PCT Pub. No.: WO2015/082527
PCT Pub. Date: Jun. 11, 2015

(65) Prior Publication Data
US 2016/0251763 A1    Sep. 1, 2016

(30) Foreign Application Priority Data

Dec. 3, 2013  (IT) .............................. MI2013A2015

(51) Int. Cl.
*C25B 9/06*  (2006.01)
*C02F 1/461*  (2006.01)
(Continued)

(52) U.S. Cl.
CPC ............ *C25B 9/066* (2013.01); *C02F 1/4674* (2013.01); *C02F 1/46104* (2013.01);
(Continued)

(58) Field of Classification Search
USPC ......................................................... 204/272
See application file for complete search history.

(56) References Cited

U.S. PATENT DOCUMENTS 3,990,962 A * 11/1976 Gotz ........................ C25B 1/12
                                                            204/268
5,102,515 A *  4/1992 Ibbott ................... C02F 1/4602
                                                            204/248
(Continued)

FOREIGN PATENT DOCUMENTS

GB        1539521 A     1/1979
WO    2011163656 A1    12/2011

OTHER PUBLICATIONS

International Search Report and Written Opinion for International Application No. PCT/EP2014/076369 (dated Mar. 17, 2015)(6 pages).

*Primary Examiner* — Harry D Wilkins, III
(74) *Attorney, Agent, or Firm* — Lucas & Mercanti, LLP

(57) ABSTRACT

A bipolar electrolytic cell particularly useful for electrochemical processes carried out with periodic reversal of polarity is provided. The cell is equipped with a series of concentric electrode pairs, the innermost pair and the outermost pair being connected to the poles of a DC generator and the intermediate pairs acting as bipolar electrodes. The different pairs of electrodes are arranged and connected in such a way that, at each stage of the process, the overall cathodic area is equal to the anodic area.

10 Claims, 2 Drawing Sheets

(51) Int. Cl.
*C02F 1/467* (2006.01)
*C25C 7/00* (2006.01)
*C25B 1/46* (2006.01)
*C25B 9/20* (2006.01)
*C25B 1/26* (2006.01)
*C25B 9/04* (2006.01)
*C25B 11/02* (2006.01)
*C25B 11/04* (2006.01)
*C25B 11/12* (2006.01)
*C25C 1/00* (2006.01)
*C25C 7/02* (2006.01)
*C25C 7/04* (2006.01)
*C02F 101/30* (2006.01)

(52) U.S. Cl.
CPC ............ *C02F 1/46109* (2013.01); *C25B 1/26* (2013.01); *C25B 1/46* (2013.01); *C25B 9/04* (2013.01); *C25B 9/203* (2013.01); *C25B 11/02* (2013.01); *C25B 11/0405* (2013.01); *C25B 11/0415* (2013.01); *C25B 11/0447* (2013.01); *C25B 11/0473* (2013.01); *C25B 11/12* (2013.01); *C25C 1/00* (2013.01); *C25C 7/00* (2013.01); *C25C 7/02* (2013.01); *C25C 7/04* (2013.01); *C02F 2001/46128* (2013.01); *C02F 2001/46133* (2013.01); *C02F 2001/46142* (2013.01); *C02F 2001/46147* (2013.01); *C02F 2001/46152* (2013.01); *C02F 2001/46171* (2013.01); *C02F 2101/30* (2013.01); *C02F 2201/4613* (2013.01); *C02F 2201/4615* (2013.01); *C02F 2201/4616* (2013.01)

(56) References Cited

U.S. PATENT DOCUMENTS

| | | | | |
|---|---|---|---|---|
| 5,234,555 | A * | 8/1993 | Ibbott | C02F 1/48 204/193 |
| 6,156,168 | A * | 12/2000 | Verrier | C02F 1/46104 204/272 |
| 8,540,855 | B2 * | 9/2013 | Hayakawa | C02F 1/505 204/248 |
| 8,658,035 | B2 * | 2/2014 | Barry | C02F 1/32 204/272 |
| 2009/0139856 | A1 * | 6/2009 | Chiarini, Jr. | C25B 9/06 204/272 |
| 2009/0205971 | A1 * | 8/2009 | Pentz | C25B 1/04 205/341 |
| 2009/0211918 | A1 | 8/2009 | Hardee | |
| 2011/0147204 | A1 * | 6/2011 | Leiato | C25B 1/04 204/272 |
| 2012/0073985 | A1 * | 3/2012 | Hahn | C02F 11/006 205/757 |
| 2015/0144499 | A1 * | 5/2015 | Benedetto | C25B 1/26 205/413 |
| 2016/0090314 | A1 * | 3/2016 | Dale | C02F 1/44 205/751 |

* cited by examiner

ELECTROLYTIC CELL EQUIPPED WITH CONCENTRIC ELECTRODE PAIRS

This application is a U.S. national stage of PCT/EP2014/076369 filed on Dec. 3, 2014 which claims the benefit of priority from Italian Patent Application No. MI2013A002015 filed Dec. 3, 2013 the contents of each of which are incorporated herein by reference.

FIELD OF THE INVENTION

The invention relates to a bipolar-type electrochemical cell and to a method of carrying out electrolytic processes therein.

BACKGROUND OF THE INVENTION

The invention relates to a bipolar electrolytic cell suitable for electrochemical processes carried out with periodic reversal of the polarity. The periodic polarity reversal of electrochemical cells, whereby each of the electrodes works alternatively as anode and as cathode for preset intervals of time, is a measure known in the art especially for preventing the formation of scaling of various kind on the surface of one of the electrodes, usually the cathode. The above for example is the typical case of cells used for electrolysing diluted alkaline brines to produce active chlorine (that is, a mixture of hypochlorite and hypochlorous acid with possible traces of dissolved free chlorine and other species at equilibrium) at the anode: especially in case brine is obtained from tap water, containing carbonates and other anions of similar behaviour, the cathode becomes a site of preferential deposition of carbonates and other insoluble salts, which is favoured by process-induced alkalinisation nearby. Such deposits negatively affect current transmission by the electrode, whose electrical efficiency may degrade irreversibly in time. The periodic reversal of current direction and thus of electrode polarity makes the surface working cathodically for a half cycle to start functioning as the anode upon reversal, being subject to a local acidification which favours dissolution of the precipitate previously formed. Other electrolytic processes sometimes subject to periodic current reversal are for instance the treatment of waste waters containing organic substances, which are degraded at the anode while various kinds of deposits tend to be formed at the cathode, or cathodic deposition of metals from electrolytic baths with simultaneous anodic degradation of organics, used for treating waters in which both types of species are present as impurities. In such cases, also the anode is often subjected to the deposition of polluting films, in this case consisting of organic residues which tend to oligomerise upon the electrode surface, and which sometimes may be removed by the mechanical and chemical action of nascent hydrogen in the subsequent cathodic cycle. For the sake of preserving the regularity of operation and maintaining operative parameters of the desired process constant, the electrodes installed in the cells, destined to work alternatingly as anodes and as cathodes, besides being spaced at constant gap must preferably be of the same size, so that it is possible to keep both current supplied and operating voltage constant (except for the change of sign). This implies that the cell design for this type of processes is mainly limited to planar-type geometries, in other words contemplating the use of pairs of facing planar electrodes. However, in many cases this can constitute an undesired limitation, involving some negative consequences. In many cases in fact this kind of processes is carried out in small size units, such as the case of active chlorine production for disinfection of waters to be used in hospital, hotel or domestic field, or in the recovery of precious metals in jewellery wastes. For such kind of applications it can be important to limit volumes inasmuch as possible, selecting cell designs of coaxial concentric type, for instance cylindrical cells with outer cathode wall and central anode. This can have the advantage, besides a better exploitation of the available volume, of improving current transmission minimising edge effects, which are known to be heavier in planar geometries and very relevant in case of overall electrode areas of small size. Cells of coaxial concentric type, both cylindrical or prismatic, are characterised however by having an external electrode of bigger size than the internal one, making operation with periodic current reversal more difficult. Keeping constant in fact current intensity between one cycle and the next and thus the production of the desired species, the variation of the corresponding electrode area would entail a corresponding variation of current density and hence of process voltage; on the other hand, should one decide to operate at constant voltage, current intensity and hence production rate would oscillate between two values corresponding to the two different electrode areas, hardly in agreement with the normal requirements of an industrial process.

It was therefore identified the need for providing electrolytic cells of concentric electrode geometry, with constant interelectrode gap and with cathode area identical to the anode area.

SUMMARY OF THE INVENTION

Various aspects of the invention are set out in the accompanying claims.

Under one aspect, the invention relates to a bipolar electrolysis cell delimited by an external body housing in its interior:

an external electrodic pair subdivided into two electrodes, separated at the edges by means of insulating elements, destined to operate alternatingly the one as the cathode and the other as the anode, and vice versa;

at least one intermediate electrode pair concentric thereto, so as to delimit a first gap therewith of generally constant width, also subdivided into two electrodes, separated at the edges by means of insulating elements, not directly supplied with electric current and intended to operate as bipolar elements;

an internal electrode pair concentric to the first two, so as to delimit a second gap of generally constant width with the intermediate electrode pair; the internal electrode pair being also subdivided into two electrodes, separated at the edges by means of insulating elements, destined to operate alternatingly the one as the cathode and the other as the anode, and vice versa, each of the two electrodes of the pair facing one of two electrodes of the intermediate pair;

means of electrical connection of one of the electrodes of the external pair with the corresponding electrode of the internal pair not facing the electrode of the intermediate pair in its turn facing the same with one of the cell poles;

means of electrical connection of the remaining electrodes of the two internal and external pairs to the other pole of the cell.

In one embodiment, the external cell body has an elongated shape and the electrode pair have prismatic or cylindrical shape.

In another embodiment, the external cell body and the electrode pairs have a spheroidal shape.

In one embodiment, there are more intermediate electrodes pairs adapted to operate as bipolar elements, in order to increase the productivity of the cell.

In a cell constructed in such a way, both the anodic area and the cathodic area correspond to the sum of the areas of half the external electrode pair and half the internal electrode pair: by reversing the electrode polarity, the values of the anodic and of the cathodic area are unchanged.

In one embodiment, both the cell body and the electrode pairs have either a prismatic or a cylindrical shape. It can be advantageous for instance to couple a cylindrical cell body with electrode pairs also cylindrical, in order to minimise the cell volume not engaged in the electrolysis reaction. In one embodiment, the two concentric electrode pairs are coaxial to the cell body. This can also have the advantage of minimising the cell volume not engaged in the electrolysis reaction. In one embodiment, all the electrodes of the cell are made of titanium or other valve metal coated with a catalytic composition containing one or more components selected from the group of platinum such as platinum metal or oxides of platinum, ruthenium or iridium. In one embodiment, the above catalytic composition also contains oxides capable of favouring the growth of compact and protective films, for instance oxides of titanium, tantalum, niobium or tin. In the context of the present specification, the term electrode made of titanium or other valve metals is used to designate an electrode obtained starting from a substrate of titanium or other valve metal (such as for example niobium, tantalum or zirconium) either pure or differently alloyed.

In one alternative embodiment, all the electrodes of the cell are made of conductive diamond, for instance boron-doped diamond, either in massive form or supported on a suitable conductive substrate, for instance of niobium or other valve metal.

The specified materials have the advantage of working in an optimum fashion for the vast majority of known anodic applications, involving the evolution of anodic products such as chlorine, oxygen, ozone or peroxides, at the same time guaranteeing a correct functioning also as cathodes.

In one embodiment, the first and second gap have a generally constant width independently ranging between 1 and 20 mm, depending on the needs of each process, as it will be clear to a person skilled in the art.

Under another aspect, the invention relates to the method of execution of an electrolytic process comprising feeding a process electrolyte inside the gaps of an electrolysis cell as hereinbefore described and supplying direct electric current to the cell poles, varying the direction of the applied current at preset time intervals, for instance every 1-120 minutes. In one embodiment, the electrolytic process according to the invention consists of the electrolysis of a salt solution with production of active chlorine. In one alternative embodiment, the electrolytic process according to the invention consists of a waste-water treatment with degradation of organic substances. In a further embodiment, the electrolytic process according to the invention consists of a metal recovery by cathodic electrodeposition, with optional simultaneous degradation of organic species.

Some implementations exemplifying the invention will now be described with reference to the attached drawings, which have the sole purpose of illustrating the reciprocal arrangement of the different elements relatively to said particular implementations of the invention; in particular, drawings are not necessarily drawn to scale.

DETAILED DESCRIPTION OF THE FIGURES

Figure 1:
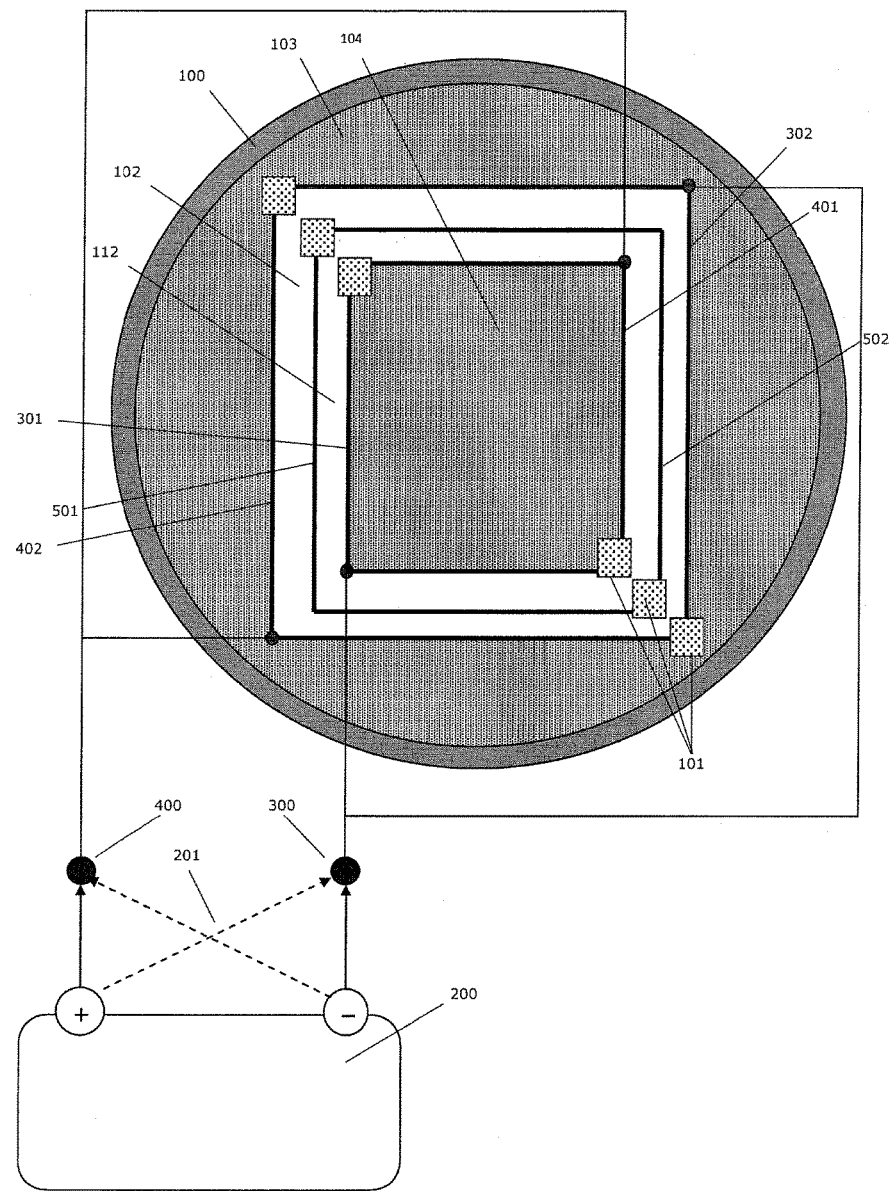
FIG. 1 shows a top-view of a section of a cell according to one embodiment of the invention comprising a cylindrical body and prism-shaped electrode pairs.

FIG. 1 shows a top-view of a section of one embodiment of the invention consisting of a cell delimited by a cylindrical body 100 in whose interior three parallelepiped-shaped electrode pairs are housed, namely: an internal pair consisting of electrodes 301 and 401 separated at the edges by means of insulating elements 101, an intermediate pair consisting of electrodes 501 and 502 and an external pair coaxial to the internal pair consisting of electrodes 302 and 402; also the electrodes of the intermediate and of the external pair are separated at the edges by means of equivalent insulating elements 101. Insulating elements 101 keep the electrodes in fixed position, preventing the short-circuiting thereof: besides performing these functions, elements 101 avoid current to be concentrated at the facing edges of each electrode pair. For such reason, elements 101 must be suitably dimensioned: inventors found out that for most of tested applications, it can be advantageous to dimension elements 101 so that the distance between the facing edges of each electrode pair is at least equal to the width of respective gaps 102 and 112. Electrodes 402 and 501 face each other, just like electrodes 302 and 502, so as to define first gap 102, of generally constant width except for the corner regions.

Similarly, electrodes 302 and 501 face each other, just like electrodes 401 and 502, so as to define second gap 112, of generally constant width except for the corner regions.

Electrode 301 of the internal pair and electrode 302 of the external pair not facing bipolar electrode 501 in its turn facing the same electrode 301 are connected to one pole 300 of a direct power supply 200 provided with means for reversing the direction of current at preset intervals of time; similarly, the other electrode 401 of the internal pair and the other electrode 402 of the external pair are connected to the other pole 400 of direct power supply 200. Regions 103 and 104 of the cell body outside the two adjacent gaps 102 and 112 are filled with insulating material, so as to confine the process electrolyte inside said gaps constituting the zone of reaction. The cell can be fed from a terminal part of cylindrical body 100 with the outlet on the opposite site and can optionally operate in continuous mode, with a single pass of electrolyte, or in batch mode.

Figure 2:
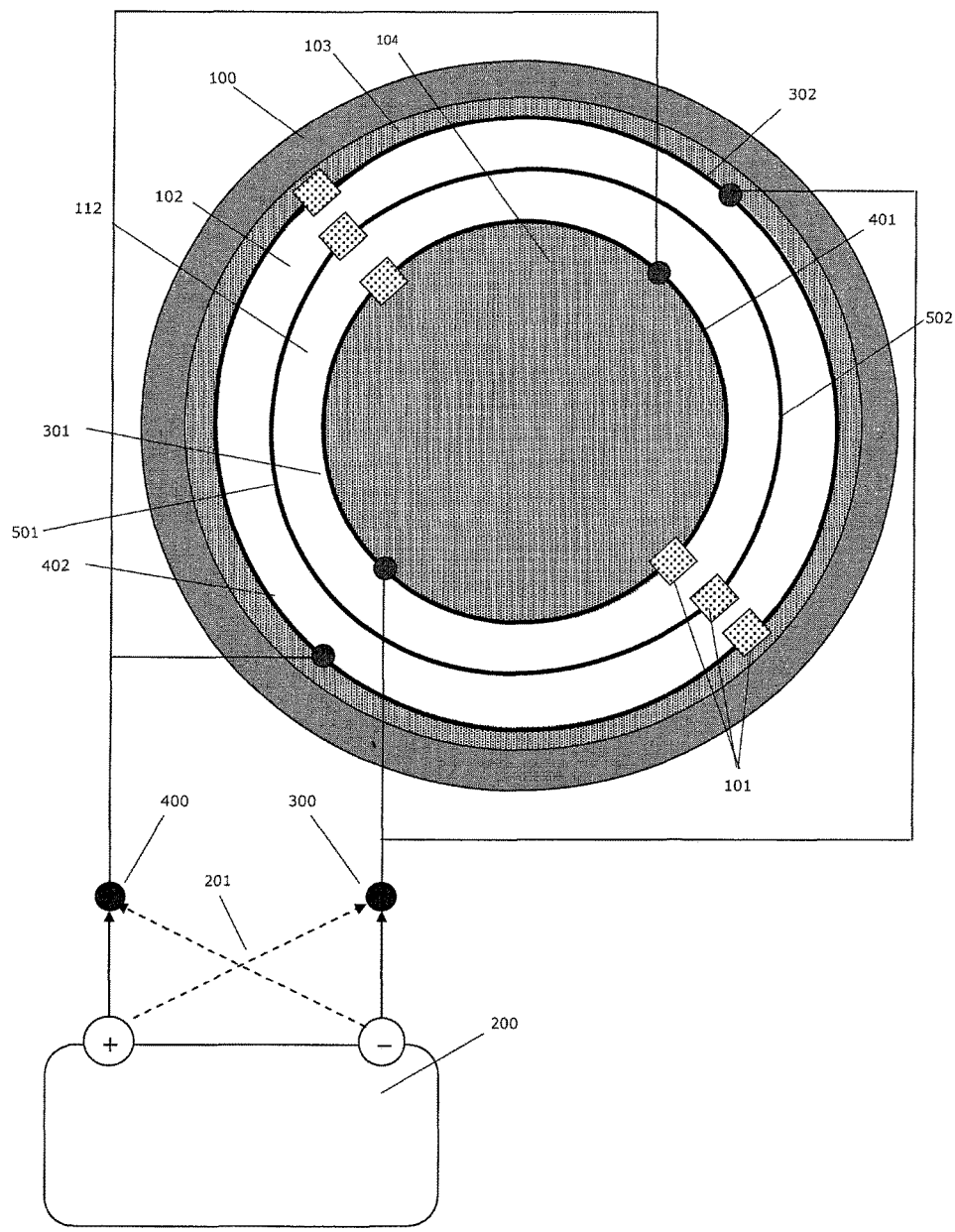
FIG. 2 shows a top-view of a section of a cell according to one embodiment of the invention comprising a cylindrical body and cylinder-shaped electrode pairs.

FIG. 2 shows a top-view of a section of a similar embodiment of the invention, differing from the previous one in the cylindrical shape of electrode pairs. This has the advantage of keeping the width of gaps 102 and 112 constant, eliminating the corner regions besides maximising the ratio of active electrode surface to total cell volume.

Some of the most significant results obtained by the inventors are illustrated in the following example, which is not intended to limit the scope of the invention.

EXAMPLE

A cell corresponding to the embodiment of FIG. 2 except for being equipped with two intermediate pairs of bipolar electrodes was fed from the relative gaps with a brine solution prepared from tap water containing 19 g/l of NaCl. The cell was equipped with a 60 mm diameter external electrode pair, a 30 mm diameter internal electrode pair and with 50 mm and 40 mm diameter intermediate bipolar electrode pairs, respectively, defining gaps of approximately 4 mm in width. All electrode pairs had a height of 50 mm. All electrodes of the various pairs consisted of a titanium sheet activated on the side facing the gap with a mixture of oxides of ruthenium, palladium and titanium according to the prior art. The total reaction volume, corresponding to the volume of the two gaps, was 32.5 ml. Upon applying a total current of 5 A, corresponding to a current density of about 1 $kA/m^2$ on the internal electrode couple and 0.5 $kA/m^2$ on the external one, and upon reversing the direction of the current flow every 180 seconds, it was possible to produce 2700 ppm of active chlorine with a constant efficiency of 66% in the course of a series of batch cycles, each lasting 60 minutes.

The test was repeated applying a total current of 10 A, always operating in 60 minute batch cycles with current reversal every 180 seconds, resulting in the production of 5530 ppm of active chlorine with a constant efficiency of 68%. During this second test, a pH increase was observed from initial neutrality up to a value of 9.6.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. Bipolar electrolysis cell delimited by an external body of elongated or spheroidal shape housing in its interior:
   an external electrodic pair;
   an internal electrodic pair;
   at least one intermediate electrodic pair,
said external electrodic pair subdivided into a first external electrode and a second external electrode of equal dimensions separated at the edges by means of first insulating elements, said internal electrodic pair subdivided into a first internal electrode and a second internal electrode of equal dimensions separated at the edges by means of second insulating elements, said at least one intermediate electrodic pair subdivided into a first intermediate electrode and a second intermediate electrode of equal dimensions separated at the edges by means of third insulating elements, said internal, external and intermediate electrodic pairs arranged concentrically with the surfaces of said first external electrode and said first intermediate electrode and the surfaces of said second external electrode and said second intermediate electrode facing each other so as to delimit a first gap, the surfaces of said first intermediate electrode and said first internal electrode and the surfaces of said second intermediate electrode and said second internal electrode facing each other so as to delimit at least one second gap, said first external electrode and said second internal electrode being connected to one pole of the cell, said second external electrode and said first internal electrode being connected to the opposite pole of the cell.

2. The cell according to claim 1 wherein said external, intermediate and internal electrodic pairs are electrodic pairs of cylindrical or prismatic shape housed in the interior of the body of elongated shape.

3. The cell according to claim 2 wherein said external electrodic pair, said at least one intermediate electrodic pair and said internal electrodic pair are coaxial to the cell body.

4. The cell according to claim 1 wherein said first and second external electrodes, said first and second intermediate electrodes and said first and second internal electrodes are made of conductive diamond in massive or supported form or of titanium coated with a catalytic composition containing one or more elements of the group of platinum.

5. The cell according to claim 4 wherein said catalytic composition contains at least one component selected from the group consisting of metallic platinum, platinum oxide, ruthenium oxide and iridium oxide and at least one oxide of an element selected from the group consisting of titanium, tantalum, niobium and tin.

6. The cell according to claim 1 wherein said first gap and said second gap have a constant width independently ranging from 1 to 20 mm.

7. The cell according to claim 1 wherein said external, intermediate and internal electrodic pairs are electrodic pairs of spheroidal shape housed in the interior of the spheroidal body.

8. Method of execution of an electrolytic process in a cell according to claim 1 comprising feeding a process electrolyte inside said first and said at least one second gap and supplying direct electric current to the cell poles, varying the direction of said direct current at preset time intervals.

9. The method according to claim 8 wherein said electrolytic process is selected from the group consisting of electrolysis of salt solutions with production of active chlorine, degradation of organic substances by electrolysis of waste-waters and recovery of metals by cathodic electrodeposition, with optional simultaneous degradation of organic species.

10. The method according to claim 8 wherein said preset time intervals have a duration of 1 to 120 minutes.

* * * * *